United States Patent
Summers

[15] 3,693,691
[45] Sept. 26, 1972

[54] PRESSURE RELIEF DEVICE

[72] Inventor: Stanley E. Summers, Woodland Hills, Calif. 91364

[73] Assignee: Ametek, Inc., New York, N.Y.

[22] Filed: Nov. 23, 1970

[21] Appl. No.: 91,845

Related U.S. Application Data

[63] Continuation-in-part of Ser. No. 54,397, July 13, 1970, abandoned.

[52] U.S. Cl. ................... 152/427, 137/68, 220/89 A
[51] Int. Cl. ........................ F16k 17/16, B60c 29/00
[58] Field of Search ............... 152/415, 427; 301/5 R; 220/89 A; 116/34 R; 137/68, 230

[56] References Cited

UNITED STATES PATENTS

| | | | |
|---|---|---|---|
| 1,297,239 | 3/1919 | Potter | 152/415 UX |
| 2,225,220 | 12/1940 | Huff | 220/89 A |
| 2,661,121 | 12/1953 | Coffman et al. | 220/89 A |
| 2,915,216 | 12/1959 | Coffman | 220/89 A |
| 3,254,666 | 6/1966 | Baker, Jr. | 152/415 X |

Primary Examiner—Gerald M. Forlenza
Assistant Examiner—Robert Saifer
Attorney—Robert E. Strauss

[57] ABSTRACT

A device is disclosed which is useful for the pressure relief of inflatable, enclosed recepticles. The device is particularly suited for use with aircraft wheels or similar wheels bearing tires which are inflated with a gas from a source that is at a pressure that exceeds the safety limits of the wheel. The device is mounted in the valve stem of the wheel and comprises a body, a flow passageway therethrough and in communication with at least one inlet and two outlet ports with one of the outlet ports sealed by a rupturable diaphragm and the other outlet port communicating with the tire chamber. The flow pressure drop through the device and the valve stem insure that the diaphragm is exposed to a pressure greater than that existing in the tire chamber during its inflation. By appropriate design, the pressure supply will rupture the diaphragm before any excessive pressure rise occurs within the tire. The use of rupturable diaphragms for this purpose provides a tamper proof relief system with a positive seal.

10 Claims, 6 Drawing Figures

PATENTED SEP 26 1972  3,693,691
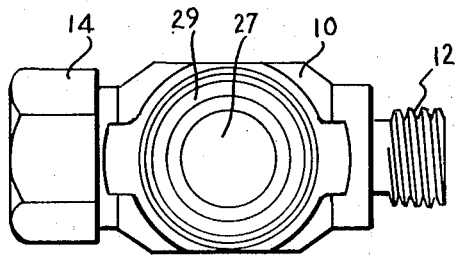
FIGURE 1
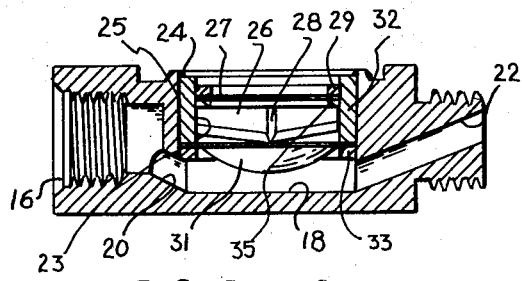
FIGURE 2
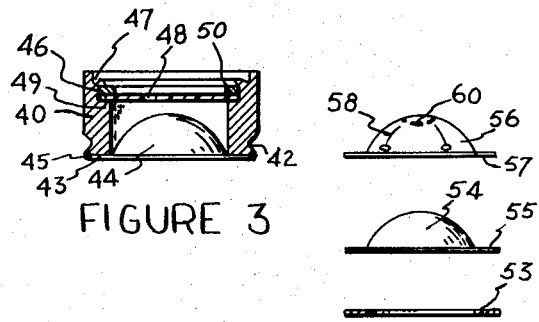
FIGURE 3
FIGURE 4
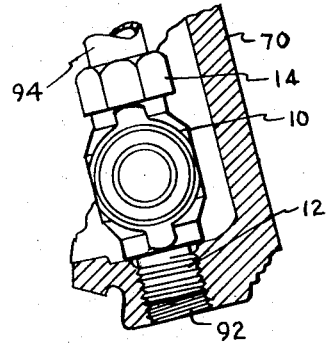
FIGURE 6
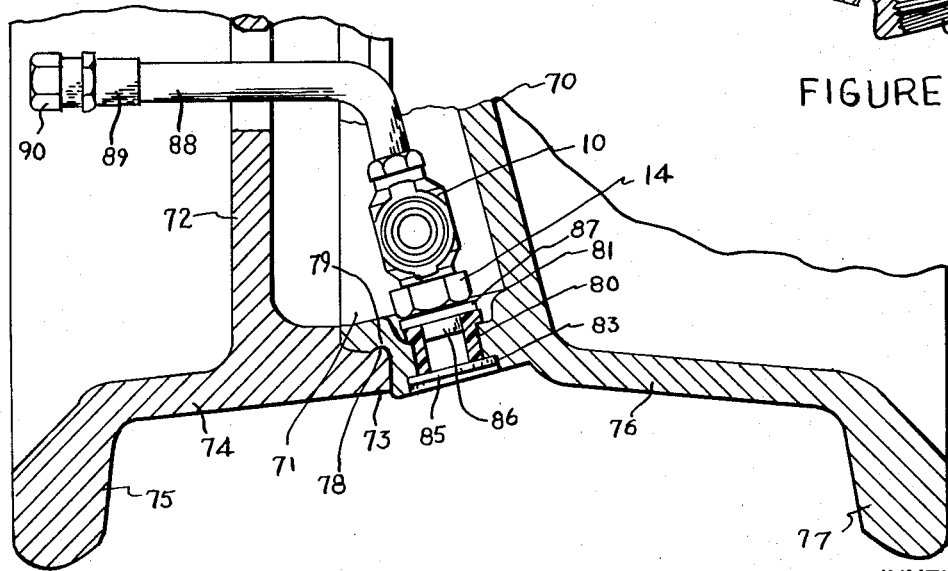
FIGURE 5
INVENTOR
STANLEY E. SUMMERS
BY
Robert Shaws
ATTORNEY

PRESSURE RELIEF DEVICE

DESCRIPTION OF THE INVENTION

This application is a continuation-in-part of my prior, copending application, Ser. No. 54,397, filed July 13, 1970 now abandoned.

This invention relates to safety relief devices for inflatable recepticles and, in particular, relates to a safety relief device which is incorporated in the assembly of the inlet valve and filling means of a wheel bearing an inflatable tire.

A safety hazard occurs when a closed recepticle such as a tire is inflated from a gas source that is at a pressure which is in excess of the safe pressure for the tire and its wheel. Although this hazard can occur with any type of inflatable tire, it is particularly acute in aircraft tire maintenance since these tires are commonly serviced with gas sources that are at very high pressures. Most aircraft wheels are designed for a maximum pressure of about 300–800 psig. The wheels are commonly formed from separate sections which are bolted together and, if overloaded, the bolts shear and the individual sections and bolt fragments explode.

Various preventative means have been used to avoid this hazard. Pressure regulators and/or pressure relief values have been provided on the gas source, however, the regulators and valves can be easily removed or altered to provide a high pressure gas source that will more quickly inflat the tire. The use of pressure relief valves on the wheel or inlet valve stem is also unsatisfactory since these valves do not provide a positive seal and can leak of the valve seat becomes worn. The spring biasing the valve can also be weakened with continued use. During high loading of the wheel, e.g., during take off of a fully laden aircraft, the relief valve could then be overloaded sufficiently to vent the tire, endangering the aircraft and its passengers. The relief valves are also fairly massive and require a body, valve seat, closure member, valve stem and spring. This mass can require use of counter weights of sizable bulk for proper tire balance.

It is therefore an object of this invention to provide a pressure relief system for an inflatable device.

It is also an object of this invention to provide such a system in combination with a wheel for an inflatable tire.

It is further an object of this invention to provide such a system with positive sealing means.

It is an additional object of this invention to provide such a system with means that retain a constant relief value during use.

It is an added object of this invention to provide such a system which will insure that the tire will never be exposed to excessive pressure.

Other and related objects will be apparent from the following description of the invention.

The aforedescribed objects are achieved by this invention which comprises a rupturable diaphragm relief device for use in combination with valve and inflation means of an inflatable receptacle such as a wheel bearing a tire. The rupturable diaphragm device comprises a body having an inlet and at least two outlet ports, a flow passageway in said body communicating between said ports, a prebulged and rupturable diaphragm extending across one of said outlet ports in sealing relationship between said passageway and said port, means associated with one of said inlet and remaining outlet ports for the attachment of inflation valve means and means associated with the other of said inlet and remaining outlet ports for the attachment of the device to the wheel or to inflation means carried by the wheel.

In preferred embodiments, the device bears a reverse acting diaphragm which is positioned with its convex side oriented to the passageway in combination with knife means positioned in juxtaposition to the diaphragm and oriented to the concave side thereof whereby, when said diaphragm is caused to snap over center under an excessive pressure loading, it is impaled by said knife means.

The invention will now be described with reference to the FIGURES, of which:

FIG. 1 is a plan view of a device useful in the invention;

FIG. 2 is a sectional view of the device;

FIG. 3 is a rupturable diaphragm insert which can also be used in the device;

FIG. 4 illustrates an alternative rupturable diaphragm assembly for use in FIG. 3;

FIG. 5 is a view of a wheel bearing the rupturable device; and

FIG. 6 illustrates an alternative installation of the rupturable device.

Referring now to FIGS. 1 and 2, the device is shown in the identical construction as described in my prior application, Ser. No. 54,397. The device is formed by a flat body 10 which has a threaded boss 12 for removable attachment to the wheel or to support means on the wheel. The opposite end of body 10 has a hexagonally shaped neck 14 for engagement with a wrench and a central, tapped bore 16 for removable attachment of the inflation means. The central portion of body 10 has a circular cavity 25 to form a cup-shaped recess. A longitudinal bore 20 defining a flow passageway is angled from bore 16 into the base of cavity 25 from the opposite end of body 10. The body 10 is substantially free of protrusions laterally of the flow passageway.

Pressure relief means are shown within cavity 25. The particular relief means shown is a reverse acting device which is preferred for its stability during use. The relief means is supported by sleeve 32 which fits into cavity 25 and is welded thereto at 24, although, other retaining means such as a threaded engagement could be employed, if desired. The rupturable diaphragm 31 is mounted on sleeve 32 with its annular flange between the bottom edge of sleeve 32 and ring 33, and the assembly can be retained by an edge weld. The sleeve 32 has a central bore with an inner rim 35 at an intermediate point along the bore. Two plates, 26 and 28, which have a V-shaped lower edge, are mounted perpendicularly to each other in bore 23 of sleeve 32 with their upper edges bearing against shoulder or rim 35. The plates can be secured in this position by an interlocking joint or by welding. The lower edges of the V-shaped plates are knife-edged to provide a sharp cutting edge that is in axial proximity to diaphragm 31. The upper end of sleeve 32 is protected by a cover plate 27 which is rested on the upper surface of rim 35. This plate can be a disc of a readily frangible material such as plastic. A ring 29 is placed over the plate 27 and this ring can be welded in place or the upper end of sleeve 32 can be rolled over the ring to retain it in place.

FIG. 3 illustrates an alternative diaphragm assembly that can be used in the invention. This assembly can be inserted in bore 25 of body 10, shown in FIG. 1, in place of sleeve 32. The assembly comprises a sleeve 40 which has a reduced diameter neck 42 with a flat face against which is seated an annular flange 43 of a prebulged diaphragm 44. The annular flange can be secured to the sleeve 40 by any suitable means, e.g., by a weld 45 which is placed about the edge of the flange. The opposite end of sleeve 40 is counterbored at 46 and grooved at 47. A flat plate 48, similar to plate 27, previously described, is placed in the counterbore resting on shoulder 49 and a ring 50 is placed in the counterbore over the plate. The inner wall of groove 47 is then rolled over the annular edge of the ring to secure it tightly against plate 48. As previously described, this protects the upper end of the sleeve and prevents debris and foreign matter from falling into the sleeve 40.

The diaphragm 44 is similar to diaphragm 31 except that it is mounted with its concave side oriented to the system pressure. Suitable rupturable diaphragms can be completely flat or, preferably, can be prebulged. The diaphragms are conveniently formed into the prebulged configuration by assembly of a flat metal stock onto the sleeve and then by application of sufficient pressure to bulge the diaphragm into the illustrated shape. This is preformed by the application of a pressure up to about 70 to 85 percent of the operational rupturing pressure. For aircraft wheel applications, the pressure relief diaphragms should relieve at pressures from about 300 to about 700 psig., typically from 550 to 650 psig. over a temperature range from about −65° to 350° F. The devices can, of course, be used on other systems wherein the relief pressures could be from about 50 to 1,000 psig. Those skilled in the art can readily select the metal and its necessary thickness to obtain the desired relief action. Typically, mild or stainless steel is used to manufacture the diaphragms in thicknesses from about 0.5 to about 20 mils, generally, from 1 to about 10 mils.

The diaphragm 44 shown in FIG. 3 operates in a substantially different manner than that shown in FIG. 2. The former fails by tensile over stress in the dome portion when sufficient pressure is applied to the diaphragm to cause it to deflect under the loading until it is stressed beyond its tensile strength and ruptures. The diaphragm shown in FIG. 2, however, fails by elastic instability in its transition portion, i.e., that annular portion between the flat flange and the bulged dome portion. When sufficient pressure is applied to the convex portion of this diaphragm, it will deflect by snapping over center to reverse its position. This snap action will impale the diaphragm on the knife edges of plates 26 and 28.

Periodic or momentary cycling of the system pressure to a high value up to about 90 or 95 percent of the rupture pressure has little or no effect on diaphragm 31, and, for this reason, the reverse acting unit of FIGS. 1 and 2 is preferred.

Repeated cycling of the pressure to a value above that used to prebulge the diaphragm 44 but less than than necessary for its rupture can alter its rupturing pressure. This cycling pressure can cause further deformation or bulging of the diaphragm and result in a lowering of its rupturing pressure. Since the devices are intended for emergency conditions, however, this repeated cycling of the system pressure may not be a common experience, and, for many applications, the devices shown in FIGS. 3 and 4 are also acceptable.

FIG. 4 illustrates a rupturable diaphragm assembly which can be used in place of diaphragm 44 of FIG. 3. This assembly, which is shown in exploded view, comprises a sealing diaphragm 54 which can be a thin plastic or metallic diaphragm that is engaged with its annular flange 55 in a fluidtight seal to the annular flange 57 of support member 56. If desired, a ring 53 can be placed beneath the flange 55 and secured to flange 57 by welding or other means. The support member 56 is formed from a prebulged metallic diaphragm such as previously described which is structurally weakened by relieving along lines 58 to impart a predetermined structural weakness to the support member 56, thereby insuring a more precise operation of the device. Suitable relieving for lines 58 can be scoring, slitting or slotting of the metal. The lines are terminated before intersection at the apex of the member 56, and, preferably, several arcuate slots 60 are cut into the member about its apex in the manner described in copending application, Ser. No. 881,234, filed Dec. 1, 1969, which is incorporated herein by reference. The arcuate slots are in proximity to the inner ends of lines 58 so that, upon failure, these lines tear into the arcuate slots which then tear in a head to tail manner to form a small apex center and a plurality of sectored leaves that open and release the support of diaphragm 54. The latter readily ruptures under the system pressure.

The devices are used in combination with the filling or inflation means normally associated with the tire. FIG. 5 illustrates a section of a wheel and the installation of the device. Various wheel constructions can be used, however, the wheel shown is of conventional design. As shown, the wheel is formed of two plates 70 and 72. The plates are engaged along a tongue and groove joint formed by neck 71 of plate 70 that nests within the sleeve 73 of plate 72. An annular tongue 78 on the inner periphery of sleeve 73 engages a groove 79 cut in the sidewall of neck 71. The plates are retained together by bolts (not shown) to form a hub. The plates have annular flanges 74 and 76 that have conventional rims 75 and 77 for retention of the side walls of the tire (not shown).

The wheel is bored at 80 and counterbored at 81 and 83, and a grommet 85 is placed in the bore. A threaded sleeve 86 is placed in the grommet and a spacer 87 is placed on the sleeve. The female end of the body 10, shown in FIGS. 1 and 2, can be threaded on the sleeve and a conventional filler tube 88 is secured to the opposite end of the body. This tube carries a conventional valve 89 at its outboard end and a threaded retaining nut 90 for removable attachment of a line from a pressured source of a gas such as air or nitrogen. Alternative means such as a spring biased quick coupling fastener could also be used, if desired.

FIG. 6 illustrates an alternative installation. In this installation, the bore 80 is tapped at 92. The relief device can be attached to the wheel by turning its threaded boss 12 into the tapped bore. A filler tube 94 is attached to the opposite end of the relief device. This tube can extend externally of the wheel in the manner illustrated in FIG. 5 and can support a conventional valve and coupling means for the pressured gas line.

The safety relief devices of this invention function to prevent any excessive pressure rise within the tire regardless of the source of the compressed gas used in filling the tire. This can be designed in the devices since the flow pressure drop through the device and attendant down stream fittings insures that the diaphragm is exposed to a greater pressure than is present within the tire. The rupturable diaphragms and their supporting structure are designed so that the devices will rupture when the line pressure at the diaphragm exceeds a predetermined value which is below the safe limits for the tire pressure. The provision of a safety relief device on each wheel in the manner described also safeguards against removal or tampering of the device as frequently occurs when a single relief device is placed at the pressure source.

The invention has been described and illustrated by reference to a preferred mode of construction that uses conventional valve and filler tube fittings. Some modifications of the illustrated device is intended to be within the scope of the invention. Thus, while the illustrations show the location of the relief device downstream of the fill valve, the device could also be located upstream so that the rupture of the device will not vent the tire. Similarly, the device could be made an integral part of the fill valve, thereby prohibiting removal of the device from the wheel.

The invention is intended to be defined by the means and structure, and obvious equivalents thereof, set forth in the following claims.

I claim:

1. In a wheel having means to support an inflatable tire and comprising a wheel, rim means about the periphery thereof for securing the sidewalls of said tire, filling means carried by said wheel comprising the assembly of a conduit, valve means carried thereby, the improvement which comprises a body having an inlet and an outlet port, a cup shaped recess on one side thereof, a flow passageway extending through the body and in communication with said ports and the innermost end of said recess, said body being substantially free of protrusions laterally of the flow passageway, a sleeve mounted in said recess entirely within the dimensions of said body and supporting a rupturable diaphragm extending across said sleeve in sealing relationship between said flow passageway and said sleeve, means carried by said body for engagement of said inlet and outlet ports in said assembly to define a flow passageway through said conduit, valve means and pressure relief device.

2. The device of claim 1 wherein a plate is removably secured across the external end of said sleeve to seal against foreign material entry into said port.

3. The device of claim 2 wherein the outside end of said sleeve bears an inner rim and said plate is supported by said rim.

4. The device of claim 1 wherein said diaphragm has a prebulged configuration with a central concave-convex portion and an annular flange and said flange is secured to and supported by said sleeve.

5. The device of claim 4 wherein said sleeve is mounted in said recess to terminate therein above the bottom of said recess and said diaphragm extends across the end of said sleeve with its flange secured to the inside end of said sleeve.

6. The device of claim 5 wherein a ring is mounted on the opposite side of the flange of said diaphragm, surrounding the convex portion of said diaphragm.

7. The device of claim 4 wherein said diaphragm is positioned with its convex side oriented towards the inlet port.

8. The device of claim 7 wherein said diaphragm is convexly oriented to said passageway in combination with knife means mounted in said sleeve and positioned downstream of said diaphragm and in axial proximity thereto such that when said diaphragm is caused to snap over center under a pressure upset it is impaled by said knife means.

9. The device of claim 7 in combination with knife means mounted in said sleeve and positioned downstream of said diaphragm and in axial proximity thereto such that when said diaphragm is caused to snap over center under a pressure upset it is impaled by said knife means.

10. The device of claim 4 wherein said diaphragm is positioned with its concave side oriented towards said passageway.

* * * * *